(No Model.)
F. C. BROWER.
GOPHER ATTACHMENT FOR CULTIVATORS.
No. 557,764. Patented Apr. 7, 1896.
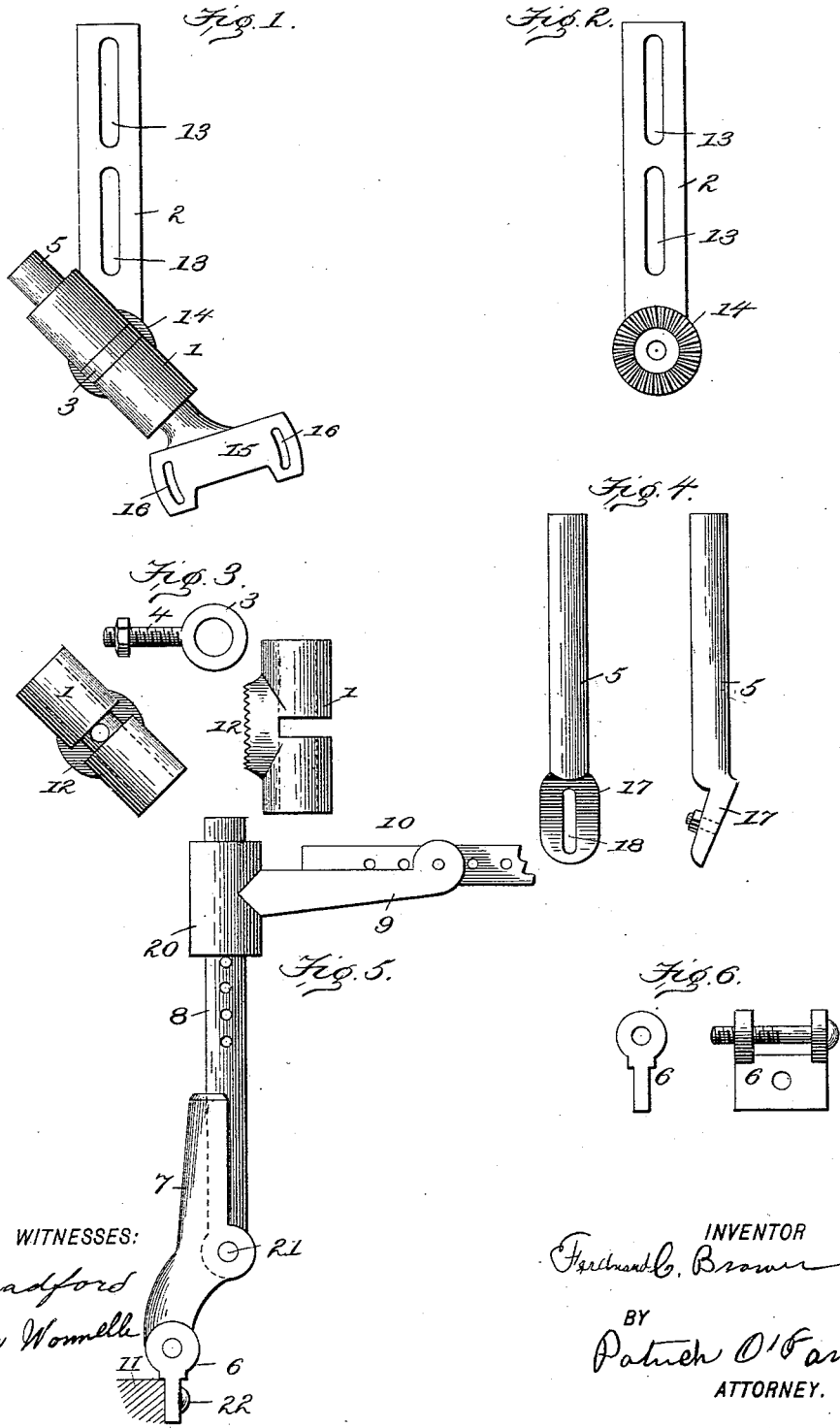
WITNESSES:
C. L. Bradford
Rolph Wommell
INVENTOR
Ferdinand C. Brower
BY
Patrick O'Farrell
ATTORNEY.

UNITED STATES PATENT OFFICE.

FERDNAND C. BROWER, OF MELVIN, ILLINOIS.

GOPHER ATTACHMENT FOR CULTIVATORS.

SPECIFICATION forming part of Letters Patent No. 557,764, dated April 7, 1896.

Application filed June 29, 1895. Serial No. 554,440. (No model.)

*To all whom it may concern:*

Be it known that I, FERDNAND C. BROWER, a citizen of the United States of America, residing at Melvin, in the county of Ford and State of Illinois, have invented certain new and useful Improvements in Gopher Attachments for Cultivators, of which the following is a specification, reference being had therein to the accompanying drawings.

This invention relates to an attachment whereby a gopher can be attached to any style of cultivator, and has for its object to provide a simple means whereby provision is had for adjustably connecting the gopher to the cultivator to meet the various requirements for which the same may be designed; also, to devise a new construction of arch for connecting gophers, and in which the end portions are reversible, whereby a greater range of adjustment and movement is had than is possible by similar prior constructions.

The improvements consist of the novel features which hereinafter will be more fully disclosed and pointed out in the claims, and which are shown in the accompanying drawings, in which—

Figure 1 is a detail view of the attachment. Fig. 2 is a detail view of the slotted coupling-iron. Fig. 3 is a detail view of the sleeve. Fig. 4 is a detail view of the modified form of the coupling-head. Fig. 5 shows the end connections, which, when duplicated and properly assembled, form the arch for connecting the gophers. Fig. 6 is a detail view of the end couplings of the arch-forming constructions.

Similar numerals refer to corresponding parts in the several views.

The numeral 1 indicates a sleeve provided on one side, midway of its ends, with a circular series of teeth 12.

The coupling-iron 2 has longitudinal slots 13 to receive the fastening-bolts by means of which it is adjustably secured to the frame of the cultivator, and has a circular portion 14 at its lower end toothed on its outer side to correspond with the circular teeth 12 of the sleeve 1 to interlock therewith and hold the parts in the required located position.

A shank 3 is inserted in the sleeve 1 and is held therein in an adjusted position by means of a binding-screw or eyebolt 4. A coupling-head 15 is provided at the lower end of the shank 3 and has opposite curved slots 16 for the reception of the fastenings by means of which the gophers are attached to the said head.

In Fig. 4 the shank 5 terminates in an oblong head 17, having a slot 18 for a purpose similar to the slots 16 in the head 15.

The iron 10 has series of openings 19 to receive the arch-fastenings, and the sleeve 20 has an arm extension 9, by means of which it is secured to the said iron 10. Through the sleeve 20 passes a shank 8, adjustably held therein by any desired means and constructed to have an iron 7 fastened to its lower end by a bolt 21. The head 6 is attached to the iron 7, and the beam 11 is secured thereto by the bolt 22.

The head 6, iron 7, shank 8, and sleeve 20, with its arm 9, are reversible and form the end portions of the arch whereby the gophers are held in place.

I claim—

1. A gopher attachment comprising the slotted plate 2 having a circular portion toothed on one side, a sleeve having a corresponding toothed portion of the coupling-iron and a shank adjustably held in the sleeve and terminating in a coupling-head, substantially as described.

2. An arch connection for gophers comprising similar end connections, comprising a perforated plate 10, a sleeve having an arm attached to the perforated plate, a shank adjustably held in the sleeve, a connecting-iron 7, secured to the shank, and the head 6, fastened to the connecting-iron 7, the parts 6, 7, 8, and 9, being reversible, substantially as set forth.

I testimony whereof I affix my signature in presence of two witnesses.

F. C. BROWER.

Witnesses:
    B. F. HULL,
    AMANDUS BUCKHOLZ.